US008592723B2

(12) United States Patent
Davidson et al.

(10) Patent No.: US 8,592,723 B2
(45) Date of Patent: Nov. 26, 2013

(54) WELD BANK DATA STRUCTURES FOR WELDING APPLICATIONS

(75) Inventors: Robert R. Davidson, New London, WI (US); Anthony J. Kowaleski, Manawa, WI (US); Bruce A. Casner, Neenah, WI (US); L. Thomas Hayes, Appleton, WI (US); Richard J. Schuh, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 255 days.

(21) Appl. No.: 13/023,096

(22) Filed: Feb. 8, 2011

(65) Prior Publication Data

US 2011/0198329 A1    Aug. 18, 2011

Related U.S. Application Data

(60) Provisional application No. 61/304,091, filed on Feb. 12, 2010.

(51) Int. Cl.
*B23K 9/10* (2006.01)
*B23K 9/12* (2006.01)
*B23K 15/00* (2006.01)

(52) U.S. Cl.
USPC ................. 219/130.5; 219/125.1; 219/121.14

(58) Field of Classification Search
USPC ........... 219/130.5, 132, 136, 137, 137.7, 129; 428/615; 323/201; 340/1.1–16.1
See application file for complete search history.

(56) References Cited

U.S. PATENT DOCUMENTS

| | | | |
|---|---|---|---|
| 6,315,186 B1 | 11/2001 | Friedl et al. | |
| 6,479,793 B1 | 11/2002 | Wittmann et al. | |
| 7,523,069 B1 | 4/2009 | Friedl et al. | |
| 2006/0124621 A1 | 6/2006 | Holverson et al. | |
| 2006/0207980 A1* | 9/2006 | Jacovetty et al. | 219/130.5 |
| 2007/0175869 A1* | 8/2007 | Auger et al. | 219/110 |
| 2007/0251932 A1* | 11/2007 | Vogel et al. | 219/130.4 |

OTHER PUBLICATIONS

International Search Report, PCT/US2011/023981, Date of Mailing Jun. 6, 2011.

* cited by examiner

*Primary Examiner* — Quang Van
*Assistant Examiner* — Michael Laflame, Jr.
(74) *Attorney, Agent, or Firm* — Quarles & Brady LLP

(57) ABSTRACT

A data structure for weld programs associates configuration data for a welding system with a plurality of weld programs and weld sequence data. The data structure allows the welding system to be configured for a particular part, operator, or stage in a welding process, and to be easily reconfigured when the part, operator, or stage changes, providing improved efficiency and flexibility in operation.

29 Claims, 6 Drawing Sheets

WELD BANK DATA STRUCTURES FOR WELDING APPLICATIONS

CROSS REFERENCE TO RELATED APPLICATION

This application claims the benefit of U.S. Provisional Patent Application No. 61/304,091, filed Feb. 12, 2010.

FIELD OF THE INVENTION

The present invention is directed to a method and apparatus for managing data in semi-automatic and automatic welding operations.

BACKGROUND OF THE INVENTION

In manufacturing facilities, welding processes are often performed by different operators, using various kinds of equipment. Welds performed during a particular step of a manufacturing process frequently include, for example, both hand-held welds and automatic welds performed by fixed automatic and robotic systems. Many of these welding processes, particularly the automated processes, are controlled by individuals who are not trained welders, but rather are trained simply to push a button to start a weld process. The weld is then performed by a robot, or by fixed automation positioning equipment. These processes are typically programmed by welding engineers, and stored in the welding equipment for use by the operator to ensure the quality of the weld.

Other processes, particularly hand-held welding processes, require more highly skilled individuals. These individuals often have specific preferences regarding welding processes and parameters, and also personal preferences as to how the welding system is configured. These individuals, therefore, prefer to set up the equipment themselves, and to select their own processes and commands.

Throughout the course of a day, moreover, different shifts of operators can use the same welding equipment. These operators often perform welds on different parts and components. Different welding parameters, processes, and operator preferences, therefore, can be associated with each shift, each operator, and each part that is welded in the facility, and at each work station.

In these environments, therefore, to maintain a high level of efficiency, it is important for the welding equipment to be flexible, so that equipment can be easily configured for different welding processes, operators, and parts. It is also important, however, for management personnel to monitor and control the welding processes and parameters to ensure consistent and proper joining of materials, to ensure that completed welds fall within predetermined quality parameters, and to ensure that material waste and operational downtime is avoided.

Present welding control systems often include a limited number of weld processes and programs, which are closely correlated to a weld sequencer. These systems, therefore, allow only a fixed number of different welding options in any given welding system. These systems, moreover, do not allow the welding system to be easily re-configured for different stages of a weld process, or for different operators or different parts. The present invention addresses these issues.

SUMMARY OF THE INVENTION

The present invention provides a data structure for storing weld configuration and sequence data for a welding system. The data structure includes one or more welding "bank" that stores both a preferred configuration (e.g., semi-automatic, automatic, robotic) weld process or program data, and weld sequence data. By structuring the weld program and sequence data with a specific configuration, welding equipment can be easily re-configured to accommodate specific parts, operators, and welds. The data structure therefore provides a welding system which is more flexible than prior art devices, and which allows a single piece of equipment to be easily used for both hand-held and automatic welding processes, minimizing capital investments required in weld cells.

In one aspect, the invention provides a data structure for storage in a welding system. The data structure comprises a weld configuration, which defines whether the system is a semi-automatic, automatic, or robotic welding system, a weld process, which defines the type of weld process to be performed by the system, and a weld sequence defining at least one of a time parameter and a welding process command parameter for controlling the weld process.

In another aspect of the invention, a welding system is provided comprising a power supply, a wire feeder, a gas valve, a memory component including a weld data structure defining a welding system configuration, a weld process, and a weld sequence, and a controller. The controller is operatively coupled to each of the power supply, the wire feeder, and the gas valve, and is programmed to retrieve the data structure from the memory, to configure the welding system based on the welding system configuration, and to control the power supply, the wire feeder, and the gas valve to provide the weld process with the parameters defined by the weld sequence.

In yet another aspect of the invention, a method for storing data is provided. A welding system configuration is stored in a memory location, and at least one of a weld process program, a weld sequence, and an operator limit is stored in a weld file, which can then be correlated with the welding system configuration in a weld bank. When a weld bank is selected, the welding system is configured as defined in the stored welding system configuration (e.g. semi-automatic, automatic, robotic), and the corresponding weld files can be accessed to provide weld program and sequence data for performing a weld.

In another aspect of the invention, a method for storing welding data in a relational database is provided. The method includes the steps of storing a plurality of inter-related tables defining a weld process program, a plurality of inter-related tables defining a weld file, and a plurality of weld bank tables that link the weld programs and the weld files. The weld process programs include at least a weld process type and a consumable type, and the weld files include a weld sequence and corresponding weld command value data for each weld file. The weld bank tables correlate the weld process programs and the weld files to provide banks of interrelated data that can be used to define a weld process for welding a specific part, tailored for a specific operator, or tailed for a specific skill level.

In yet another aspect of the invention, a memory for storing data for access by an application program executed by a computerized welding system is provided. The memory includes a weld bank data structure correlating a weld system configuration and a weld file, where the weld file comprises a welding process program data structure and a weld sequence data structure defining at least one of a time parameter and a welding process command parameter. The application program is programmed to retrieve the weld bank data structure, configure the computerized welding system using the weld configuration, and to perform a weld using data stored in the welding process program and the weld sequence data structures.

The weld system configuration selection can include data defining at least one of a semi-automatic, automatic, and robotic welding configuration for the computerized welding system; the welding process program can include data for defining at least one of a metal inert gas, pulsed metal inert gas, short circuit metal inert gas and a regulated metal deposition process performed by the computerized welding system. The welding process program can also include data defining at least one of a wire type, a wire alloy, a material, a material thickness, and a gas.

The weld sequence can include data for defining at least one of a pre-flow period, a run-in time, an arc start, a weld start, a weld ramp, a weld, a crater fill, an arc stop, a burnback, and a post-flow sequence, and the welding process command parameter can comprises at least one of a voltage, a wire feed speed, and a trim command level for the computerized welding system.

The weld configuration selection can includes an operator configuration, which can be at least one of a trigger hold selection and a dual-schedule selection.

In some embodiments of the invention, the weld bank data structure can include a plurality of weld files, each of the weld files including a welding program selection and a weld sequence selection defining a weld in a series of welds to be performed to weld a defined part. The weld files can also each include an arc monitoring limit for determining whether a weld performed by the computerized welding system is within a selected parameter. The memory as recited in claim 10, wherein the arc monitoring limit includes at least one of an actual weld voltage limit, an actual weld current limit, and an actual wire feed speed limit.

In another aspect of the invention, a computerized welding system is provided including a power supply, a wire feeder, a gas valve, and a memory storing a weld bank data structure linking a weld system configuration, a weld process program, and a weld sequence through a relational database. A controller is operatively coupled to each of the power supply, the wire feeder, and the gas valve, the controller being programmed to retrieve the data structure from the memory, configure the computerized welding system based on the weld system configuration data, and to control the power supply, the wire feeder, and the gas valve to provide the weld process with the parameters defined by the weld sequence.

The controller can be further programmed to monitor the arc monitoring limit while performing a weld; to provide an alert signal to an operator when the arc monitoring limit is exceeded; or to store at least one of a time stamp, an operator identifier, and a weld parameter value correlating with the selected arc monitoring limit in memory when the arc monitoring limit is exceeded.

The weld system configuration can include a selected weld file transition identifier for transitioning between a selected weld file and a subsequent weld file, and the controller can be further programmed to transition from the currently operational weld file and a subsequent weld file when the identifier is activated. The computerized welding system can also include a welding gun operatively connected to the computerized welding system, and the weld file transition identifier can comprise releasing a trigger of the weld gun, or activating a trigger of the weld gun. Alternatively, the computerized welding system can include a dual schedule switch operatively connected to the computerized welding system, which can provide a signal to identify when a transition between weld files is desired. The controller can be further programmed to compare weld data acquired during a weld to stored weld data criteria, and to switch from a selected weld to a subsequently defined weld in a sequence when the acquired weld data meets the stored weld data criteria.

In still yet another aspect of the invention, a method for storing welding data in a relational database in a memory readable by a computerized welding system including an application program for executing a weld based on data retrieved from the relational database is provided. The method includes storing a plurality of inter-related tables defining a weld process program including a weld process type, storing a plurality of inter-related tables defining a weld file, the weld file including a weld sequence and a weld process command, and storing a plurality of weld bank tables, the weld bank tables correlating the weld process programs and the weld files to provide banks of interrelated data for defining weld process parameters for a weld application program to be executed by the computerized welding system.

In some embodiments, the step of storing inter-related tables defining the weld process program can further comprise storing a consumable type, storing a name of the weld bank in the memory, or naming the weld bank tables to correspond the weld bank to at least one of a part, an operator, a shift, or a welding skill level.

In other embodiments, the weld bank can be stored on a portable memory device, such as a universal serial bus flash drive.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
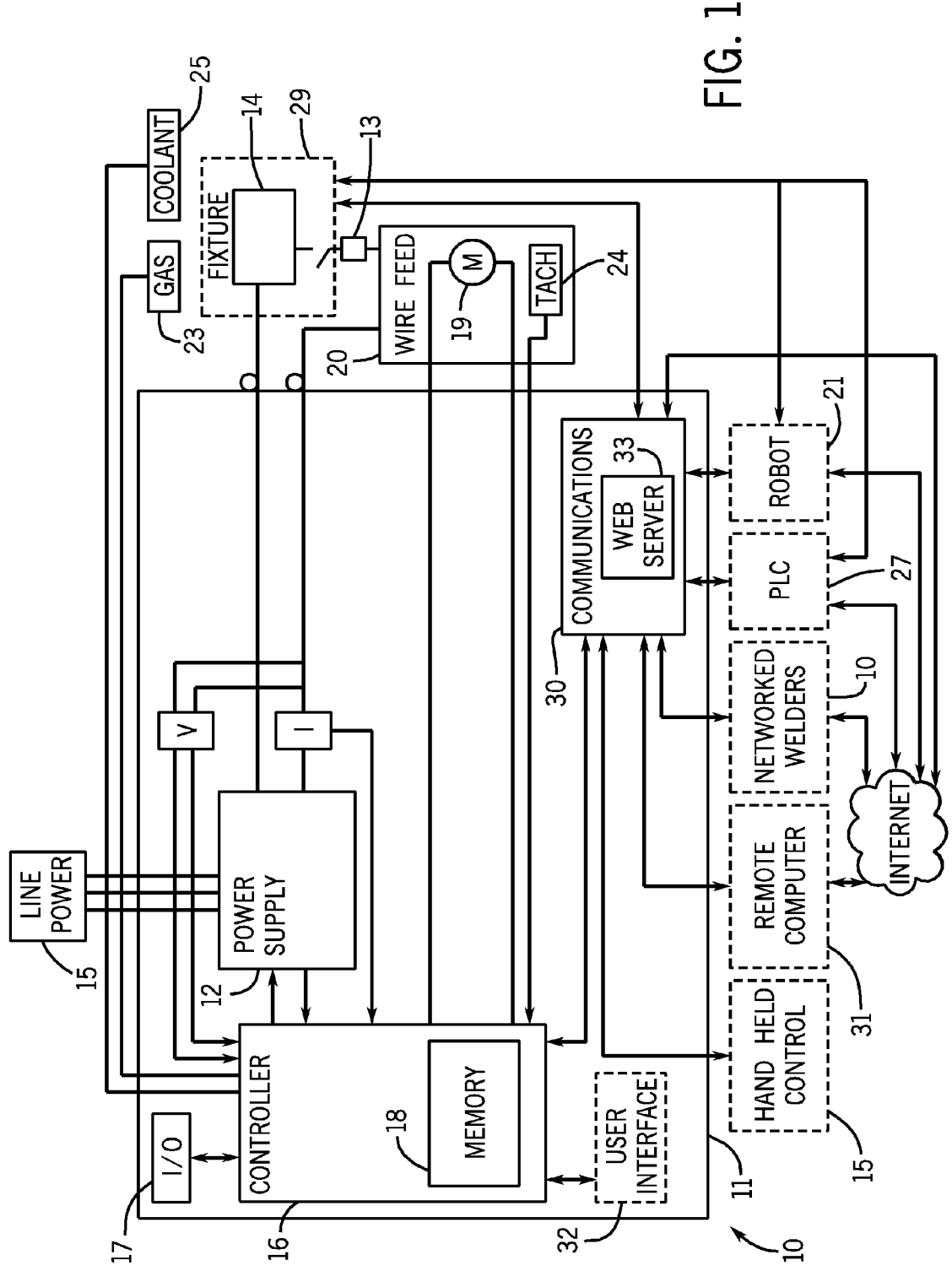
FIG. 1 is a block diagram of a welding system capable of use in the present invention.

Referring now to the Figures and more particularly to FIG. 1, an exemplary welding system 10 for automatic and semi-automatic welding that can be used in accordance with the present invention is shown. The welding system 10 includes a welding power supply 12, a controller 16, and a communications system 30 for bi-directional communications with external components. The controller 16 of welding system 10 can further be connected to external welding components including a wire feed system 20, a gas valve 23, and, optionally, a coolant system 25.

Referring still to FIG. 1, the wire feed system 20 includes a motor 19 that drives wire through drive rolls and a liner to a torch or gun 13 including a contact tip. The gas valve 23 can be either an on/off valve, a metered valve controlled by controller 16, or can include a separate or integral flow meter. Similarly, when a coolant system is provided, the system can include an on/off or metered valve, and flow metering devices. The power supply 12 can be a constant voltage power supply or a constant voltage/constant current power supply, and preferably includes pulsing capabilities, as discussed more fully below.

Referring still to FIG. 1, the controller 16 can include one or more microcontroller, microprocessor, digital signal processor, or other programmable controller, along with one or more internal or external memory component 18, capable of storing weld configuration data, welding programs and weld sequence data and procedures specified by the user, as described more fully below.

Communications between the controller 16, operators, and external components can be provided through a user interface 32, the communications system 30, and input/output communications board 17. The user interface 32 can include a user display and input devices, such as keys, switches, joysticks, analog or digital potentiometers, or other devices to provide information to and receive information from an operator or user of the welding system 10. The user interface can, for example, be mounted in a housing 11 with the power supply 12 and controller 16, or be provided in a separate housing from the power supply 12. Although shown connected to the controller 16 in FIG. 1, the user interface 32 can be connected as a remote control 15 through communications system 30.

The communications system 30 can include, for example, an embedded web server 33, serial communication devices such as DeviceNet, Profibus, RS-232, wired or wireless network communication devices such as an Ethernet, LAN, WAN, or other network, memory devices such as USB ports, and other communications systems. The communications system 30 can be linked to the components of a welding cell, including flexible or hard automation components, such as a welding robot 21, a programmable logic controller (PLC) 27, and fixtures 29. Alternatively, or additionally, the external components can include one or more computer or computer network 31, or a series of networked welding systems 10. The communications system may also be connected to external ports such as Universal Serial Bus (USB) ports, which allow a user to upload and download data from the memory 18, and to store the data on portable memory devices such as a USB flash memory device.

Referring still to FIG. 1, an exemplary input/output board (I/O board) 17, which provides connection points for external equipment to both provide input signals to the welding system 10 and to receive discrete outputs from the welding system 10 is shown. The inputs and outputs can include, among other indicators, welding process state conditions and error conditions. Common welding process state condition signals input and output through the I/O board 17 can include, for example, triggering signals for triggering a welding sequence, contactor on (weld on), gas valve on (purge), wire feed motor foreword (jog), wire feed motor reverse (retract), weld program selection, and touch sense detect. Common error conditions can include, for example, voltage sense error, arc start error, wire stick errors, motor over current errors, coolant flow errors, or gas flow errors. Analog input and output signals, including voltage command and feedback, wire feed command and feedback, and current feedback can also be provided on the I/O board 17. Welding state data, error data, feedback and command data can also be transmitted to and from the welding system 10 through communications system 30 discussed above, and by access to a weld parameter library as described above.

As described above, the welding system 10 can be configured for different modes of operation, including semi-automatic, automatic, and robotic welding. Additional data for configuring the welding system can also be selected to meet operational requirements or user preferences. For example, when a robotic configuration is selected, a specific robot type or manufacturer can also be specified. The robot type and manufacturer can define, for example, which weld command signals are provided by the robot, and which weld command signals are provided by the controller 16 of welding system 10. Similar configuration selections could be provided for other fixed and flexible automation systems. Other operator configuration parameters, such as a trigger hold function for semi-automatic applications in which the operator prefers not to maintain control of the trigger, or a dual scheduling function, which allows the user to activate a switch to select between stored welding programs, can also be selected. Although specific examples are given here, any configurable parameter that is set once for each corresponding weld bank 106 can be included as part of the configuration.

The mode of operation, and other configuration data can be, for example, selected by an operator through user interface 32, through an interface associated with an externally connected device such as a robot 21 or PLC 27, or from an external device through communications interface 30, or through activation of one or more input in I/O board 17. The configuration data can be stored in memory 18, as discussed below.

Referring still to FIG. 1, external devices, such as a handheld gun or torch or other device with a trigger switch, a robot controller associated with robot 21, PLC 27, or a remote system and display such as an externally connected PC, can provide a signal to the controller 16 of the welding system 10 to start a weld. The weld parameter commands can be retrieved from memory 18, or be provided from the robot 21, PLC 27, or other external device through communications system 30, or selected at the user interface 32. As described below with reference to FIG. 2, system configuration, weld process, and weld sequence data is preferably stored in a weld bank data structure, which provides a highly flexible structure for storing weld data, and further provides a means for easily switching between various user configurations.

Referring still to FIG. 1, the welding system 10 is connected to an input power supply line 15, typically a three phase supply, which provides power both for the control circuitry and for the power supply 12. Voltage and current sensors (not shown) can be provided on the input power supply line to allow the power supply to be monitored, typically by controller 16. The welding power supply 12 is preferably an inverter power supply, and, as described above, can be a constant voltage power supply or a constant voltage/constant current power supply, and preferably includes pulsing capabilities, providing the ability to perform MIG (GMAW) welding, pulsed MIG (GMAW P) and flux-cored (FCAW) welding. Processes available can also include spray MIG, short circuit MIG, and Regulated Metal Deposition (RMD).

Figure 2:
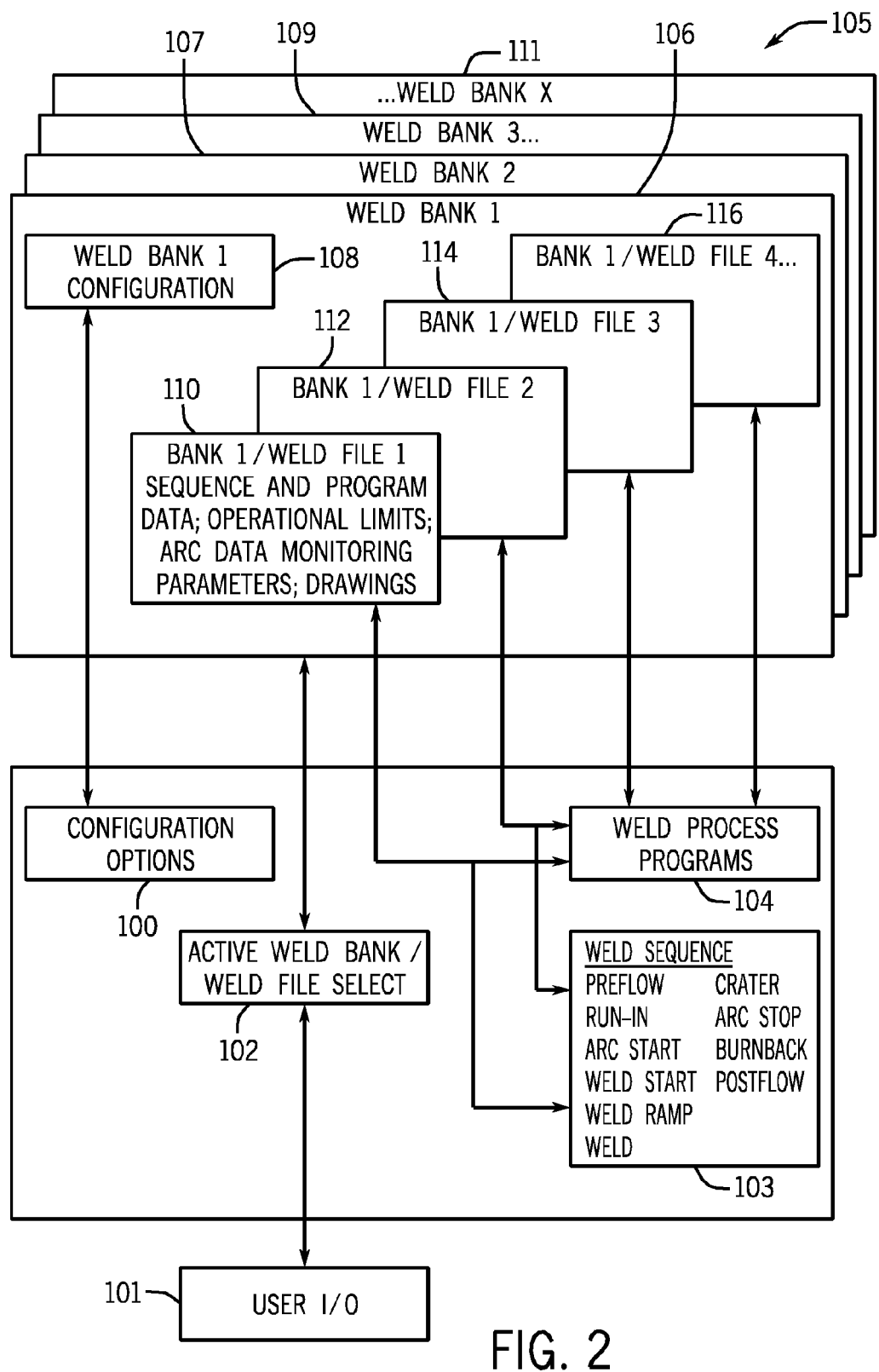
FIG. 2 is a block diagram of a memory component of the welding system of FIG. 1.

Referring now to FIG. 2, a block diagram schematically illustrating portions of the memory 18 is shown, including a weld data structure 105 comprising a plurality of substructures arranged in individual weld banks 106, 107, 109, 111, etc. Each weld bank 106 stores a user configuration 108 which, as described above, includes data or commands for configuring the welding system for automatic operation, semiautomatic operation, or a robotic operation. The user configuration data can also include operator configuration preferences, such as a trigger hold, and a dual scheduling configuration. Additionally, the configuration data can include data specifying corresponding automatic equipment, such as a type or manufacturer of a robot, as discussed above. Remote program select, trigger input options, and criteria for identifying when to switch between a currently welded weld file and a subsequent weld file in a sequence can also be stored as part of the configuration, as discussed more fully below with reference to FIG. 4. Identifiers for identifying when to switch between weld files in a defined sequence can include, for example, when a trigger of gun 13 is either activated or released, input from a dual schedule switch, or when the controller 16 determines that predetermined stored weld criteria or time frames have been reached. As discussed above, any parameter for configuring the system specifically for a given bank, and that is activated upon switching on or between weld files can be included as part of the configuration.

Referring still to FIG. 2, each weld bank 106 further includes one or more weld file 110, 112, 114, 116, etc. Each of the weld files 110-116 is associated with a selected weld process or program 104. The weld process or program data 104 can include a predefined weld process type such as spray MIG, pulsed MIG, short circuit MIG, and Regulated Metal Deposition (RMD), and can also include specific weld parameters selected to optimize the weld for selected material types and/or thicknesses, shielding gas, wire and other material parameters. The weld programs or processes can be "canned" programs stored in a separate memory location in memory 18, and moved into or correlated with the individual weld banks 106 and weld files 110, 112, 114, and 116. In other applications, the weld programs and processes could be customized and stored in memory 18 or with a specific weld bank 106 along with the other data. Typically, in this type of application, changes to the weld process programs would be protected by password or other security devices and would be accessible only to welding engineers or other skilled personnel. For example, a specific pulse program could be provided in a weld bank 106 which would be accessible for use only when weld bank 106 is active. Similarly, a specific weld process program could be stored in a specific weld file 110.

Referring still to FIG. 2, each weld file 110, 112, 114, 116 in weld bank 106 can also include weld sequence data 103. An exemplary weld sequence can include, for example, a preflow period, run-in time, arc start, weld start, weld ramp, weld, crater fill, arc stop, burnback, and post-flow. The pre-flow and post-flow periods are typically timed periods of gas flow, although in some applications these applications may also be associated with a gas flow level. Run-in, arc start, weld start, weld ramp, weld and crater periods can include both a time parameter and weld command parameters, such as specific voltage, wire feed speed, and trim levels. The sequence times and weld command levels for each sequence parameter can be specified by the operator in the weld file 110. Various other types of parameters, including a ramp of the wire feed speed during run-in, can also be specified. Preferably, default parameters will be stored in memory 18 and associated with specific programs or processes 104, which can then be changed or adjusted by the operator. Weld sequence stages can be stored in memory 18 and then correlated with specific weld files 110, 112, 114, 116 and correlated with weld programs 104.

Referring still to FIG. 2, in addition to the weld program 104 and weld sequence 103 data, operator limits and arc data monitoring parameters can also be specified and stored in the weld bank 106. The operator limits, for example, can provide a range of acceptable weld command parameters, such as a maximum and/or minimum voltage and a maximum and/or minimum wire feed speed that can be provided by the weld operator during a weld. The arc data monitoring parameters can, for example, specify which of a plurality of available welding parameters to monitor (volts, wire feed speed, current), provide a range of acceptable values for the monitored parameters, and be used to prompt an alarm (e.g. a visual display such as a light, or an audio alarm) to the weld operator when the acceptable range is exceeded. Alternatively, or in addition to the alarm, out-of-range values can be stored in memory 18 with, for example, a time stamp and/or operator identifier for quality control or operator training. Out of range values and corresponding identifiers can also be transmitted to an external device.

Figures or drawings, such as CAD drawings of specific parts can also be stored in the weld bank 106, the weld file 110, or both. For example, a CAD file stored with the weld bank 106 could provide a drawing and weld parameter data for a series of welds for a part that is intended to be welded using the weld files stored in the weld bank 106. Each of the series of welds could correspond to a specific weld file. Alternatively, each weld file 110 could be correlated with a specific part, and a CAD drawing corresponding to the part can be associated with each file.

Although weld banks 106 could be stored with default names such as those shown in FIG. 2 (weld bank 1, weld bank 2, etc.), preferably the operator will assign an alpha-numeric name or designator to the weld banks 106, and also to the specific weld files 110, 112, 114, 116. Again, data for naming the specific banks can be provided through user interface 32, through communications device 30, e.g. from a networked computer, or from other external devices or memory storage components. The weld banks 106 and weld files 110 can be named for specific parts, operators, or shifts to simplify locating the appropriate files. For example, one weld bank 106 could be a "night shift" bank that includes weld files for parts that are welded during this shift. Alternatively, a weld bank could be named "John Smith" and contain configuration and weld preferences for operator John Smith. Weld banks 106 could, similarly, be named for various automatic, semi-automatic, and robotic applications. Weld banks could also be named based on experience levels of the weld operator, e.g. beginner, experienced, expert. The weld files 110 can also be assigned specific names. For example, the John Smith bank could include weld files 110 designated for specific parts, e.g. "seat" or "handle". As described above, these files could be correlated with CAD drawings of the specific parts.

The active weld bank 106 and weld file 110 can be selected through a user input device 101, which can be user interface 32, or a user interface associated with a remote computer 31, handheld control 15, PLC 27, robot 21 or network welder 10. In other applications, the active weld bank might also be selected by communications from an external device through communications system 30, or uploaded from external memory storage or other devices connected to the controller through communications system 30. In other applications, discrete digital logic signals could be provided, for example, through I/O board 17. Various other types of communication signals for selecting a weld bank 106 and weld file 110, 112, 114, or 116 will be apparent to those of ordinary skill in the art.

Referring again to FIG. 2, the active weld bank 106 and/or weld file 110 can be correlated with a specific input device or action. Here, for example, the memory 18 can include a look-up table or other data structure correlating selected weld banks 106 and/or specific weld files 110 within the weld banks 106 with on/off or other inputs from internal or external devices. A weld bank and/or weld file 110 can be associated, for example, with a particular trigger input. For example, if a trigger input is received from a robot or other known automated device, a weld bank 106 configured for automatic operation, and a corresponding weld file 110, could be selected. Alternatively, when a trigger is received from a semi-automatic gun, a weld bank 107 configured for semi-automatic operation could be selected for operation, along with a weld file 110 corresponding to the selected bank. The input data identifying the trigger could be a single on/off digital input provided through I/O board 17, a combination of digital input signals, or be provided by serial communications through an input device such as communications system 30.

In a specific example, a welding process for a part could involve two stages: a first stage in which two components are tacked together, and a second stage in which the components are welded along seams. In the tacking stage, a hand-held gun is used. For this operation, a first weld bank 106 storing a configuration for semi-automatic welding would be selected when the trigger signal is received from the hand-held gun, along with a weld file 110 providing appropriate parameters for the tack weld. In the second stage a fixed or flexible automation system can be used to perform the weld. Here, after the tacking procedure is completed, a trigger signal from the automated equipment can be used as a signal to switch to a second weld bank 107 configured for automatic welding. As discussed above, the weld bank 107 can be correlated with one or more weld files 110, 112, 114, 116. After a weld bank 107 is selected, any of the weld files in the weld bank 107 can be accessed to perform a weld. For example, each weld file 110, 112, 114, 116 can represent a weld segment in a series of welds performed to weld the part. The specific weld file, again, can be selected through a user interface 32, through communications device 130, selected by activating and de-activating signals at the I/O board 17, or in other ways which will be apparent to those of skill in the art.

In another example, weld banks 106 or weld files 110 within a weld bank 106 can be corresponded with operator identifiers, such as finger prints, or retinal scans; or with electronic identifiers such as RFID tags, magnetic strips, USB flash drive or key, or other devices. Here, when a weld operator begins a shift, the operator presents an identifier for scanning or verification and the controller selects the appropriate weld bank 106 and/or weld file 110 based on a comparison of the received identifier to stored data.

In another example, weld banks 106 and/or weld files 110 could be switched automatically based on time or other factors. For example, the active weld bank 106 or weld file 110 could be switched when the shift changes, based on data acquired by monitoring of internal clocks. Various other methods for identifying a weld bank 106 for use, and for switching between weld banks 106, 107, 109, 111, will be apparent to those of ordinary skill in the art.

Figure 3:
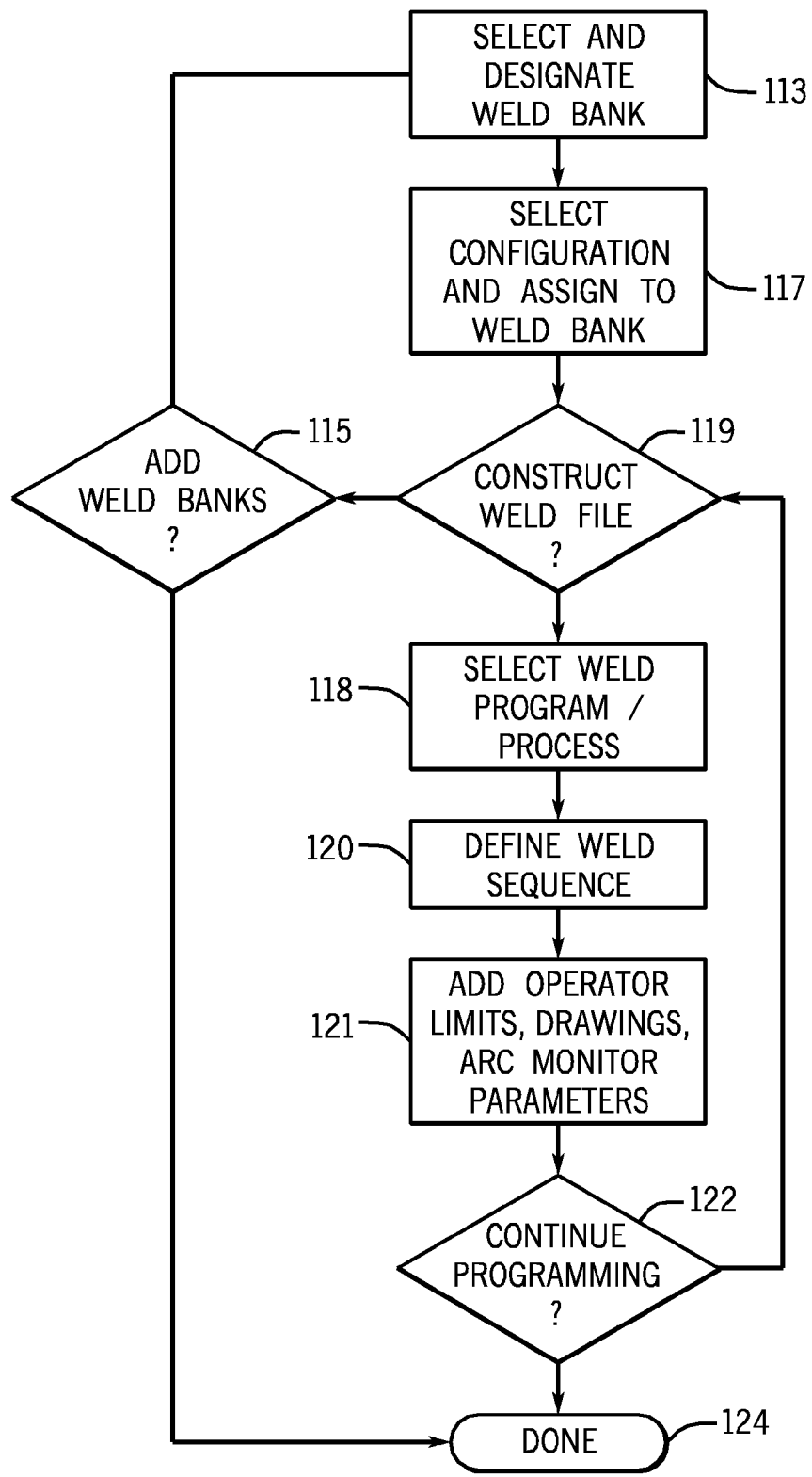
FIG. 3 is a flow chart illustrating the steps for programming the data structures stored in the memory component of FIG. 2.

Referring now to FIG. 3, a flow chart is shown illustrating one method for programming weld banks 106 in the data structure 105. Here, the user initially accesses the memory 18 through, for example, the user interface 32 or the communications interface 30 and selects a particular weld bank 106 for programming in step 113. In step 117, the user selects a configuration from a number of stored configuration options 100 in memory 18. The selected configuration is then stored in the weld bank 106 to provide system configuration information for each weld associated with the weld bank 106. In process step 119, the user can then select a weld file 110 to be correlated with the selected weld bank 106. If the user chooses not to define a weld file 110 at this time, the user can, at decision block 115, either return to step 113 to designate a second weld bank 106, or complete the programming process.

If the user chooses to program a weld file 110, the user selects a weld process program from those stored in the weld process programs 104 of FIG. 2 as described above, by identifying a process step (MIG, Pulse MIG, RMD), or by entering weld material parameters such as material, gas, and thickness, which can provide a menu of selections for a user or identify a particular process. Once a process is selected, the user can define parameters for a weld sequence in step 120, such as, for example, pre-flow and post-flow times; weld voltage and wire feed speed parameters, and other command variables, which can be stored in the weld file 110. After the weld sequence 103 is defined, the user proceeds to process block 121, which allows the user to enter additional optional data into the weld files, such as operator limits, arc data monitoring parameters, or drawing files, as discussed above. After these optional features are added, or if the user chooses not to add any optional features, the process moves to decision box 122 which allows the user to specify another weld file associated with this bank. If the user chooses not to enter additional files, the user is returned to decision block 115 where the process of programming the weld bank 106 can be completed at step 124, or the user can select and designate additional weld banks as shown in step 113. The weld banks 106 and associated weld files can be named by the user, either as entered, or after the process is complete. Similarly, the user can be prompted to correlate the specific weld banks with particular operators, trigger inputs, or other parameters as described above.

After the data is entered, the weld data structure 105 can include a number of weld banks 106 and corresponding weld files 110, 112,114, 116. By way of example, an exemplary set of weld process programs 104 could include the following:

| | |
|---|---|
| Program 1: | Carbon Arc Gauge |
| Program 2: | MIG, Wire (Steel 0.045 inch E70), Gas (90% Argon, 10% CO2) |
| Program 3: | Process (Pulse), Wire (Steel 0.045 inch E70), Gas (90% Argon, 10% CO2) |
| Program 4: | Process (Accupulse), Wire (Steel 0.045 inch E70), Gas (90% Argon, 10% CO2) |

With these weld programs, exemplary weld banks for two operators, Frank and Nick, could be configured as follows:
Weld Bank1:
  Identifier/Name: Frank
  Configuration: Semiautomatic 450, Trigger program select On, Trigger hold is ON, Arc Start Error is On
  Weld File 1:
    Weld Process Program 4
    Weld Sequence Data: Preflow (0.5 seconds), Start Weld (1 second, 200 ipm, 50 trim, 25 sharp Arc), Weld (350 ipm, 50 trim, 23 Sharp Arc)
  Weld File 2:
    Weld Process Program 4
    Weld Sequence Data: Weld (425 ipm, 50 trim, 25 Sharp Arc)
  Weld File 3:
    Weld Process Program 2
    Weld Sequence: Weld (350 ipm, 22.5 volts, 60 Inductance)
  Weld File 4:
    Weld Process Program 4
    Weld Sequence: Preflow (0.5 seconds), Start Weld (0.5 seconds, 200 ipm, 50 trim, 25 sharp Arc), Weld (500 ipm, 50 trim, 23 Sharp Arc), Crater (0.75 seconds, 150 ipm, 50 trim, 25 sharp Arc)
Weld Bank 2:
  Identifier/Name: Nick
  Configuration:
    Semiautomatic 450

Weld File 1:
    Weld Process Program 3
    Weld Sequence: Start Weld (0.6 seconds, 200 ipm, 50 trim, 25 sharp Arc), Weld (380 ipm, 50 trim, 25 Sharp Arc)
Weld File 2:
    Weld Process Program 3
    Weld Sequence: Weld (425 ipm, 50 trim, 25 Sharp Arc)
Weld File 3
    Weld Process Program 2
    Weld Sequence: Weld (300 ipm, 50 trim, 25 Sharp Arc)
Weld File 4
    Weld Process Program 3
    Weld Sequence: Preflow (0.5 seconds), Start Weld (0.5 seconds, 200 ipm, 50 trim, 25 sharp Arc), Weld (500 ipm, 50 trim, 23 Sharp Arc), Crater (0.75 seconds, 150 ipm, 50 trim, 25 sharp Arc)

In this example: Nick and Frank are two operators who weld the same part. The part has 4 welds, and therefore 4 weld files. Nick and Frank each have set up their own weld banks to optimize the settings and configurations for their own maximum performance, skill level and preferences. Here, for example, Frank prefers that the trigger program select configuration be On, that the trigger hold be activated, and that an arc start error be activated. Nick prefers a more simple semi-automatic configuration. Each operator has selected different weld programs and parameters for welding the part. Although not shown here, as described above, operator limits, arc data monitoring parameters, and CAD drawings could also be associated with the weld banks and/or weld files.

Referring again to FIG. 1, in operation, when the controller 16 receives a trigger signal to start a weld as described above, the controller identifies the selected weld bank 106 and weld file 110, and retrieves the stored weld data from memory 18. Based on the weld sequence data stored in the selected weld file 110, the controller 16 activates the gas, wire feed, and contactor controls, commanding the gas valve 23 to provide shielding gas, the wire feed system 20 to drive filler metal from the motor 19 to a contact tip in gun or torch 13, and the power supply 12 to provide welding current and voltage to start an arc at the work piece 14. Command levels for controlling the weld can be retrieved from the weld file 110 in memory 18, or in some applications, be received from the external components, such as robot 21 and PLC 27, or other controllers or computers as discussed above, either in the form of analog or digital control signals.

During operation, the controller 16 receives feedback from a voltage sensor 26, a current sensor 28, and a wire feed speed sensor or tachometer 24, and can also optionally monitor gas flow through a gas flow sensor associated with the gas valve 23, and coolant flow in coolant system 25. The feedback data is used by the controller 16 to control the power supply 12, wire feed system 20, and gas valve 23. Additional feedback data can also be provided from external components. This data can include, for example, travel speed of the torch, proximity sensor input data, clamp closure data, and other data. The controller 16 can also monitor input voltage and current levels from input power lines, and provide feedback data relate to these values, as well as average motor voltage and current values.

Figure 4A:
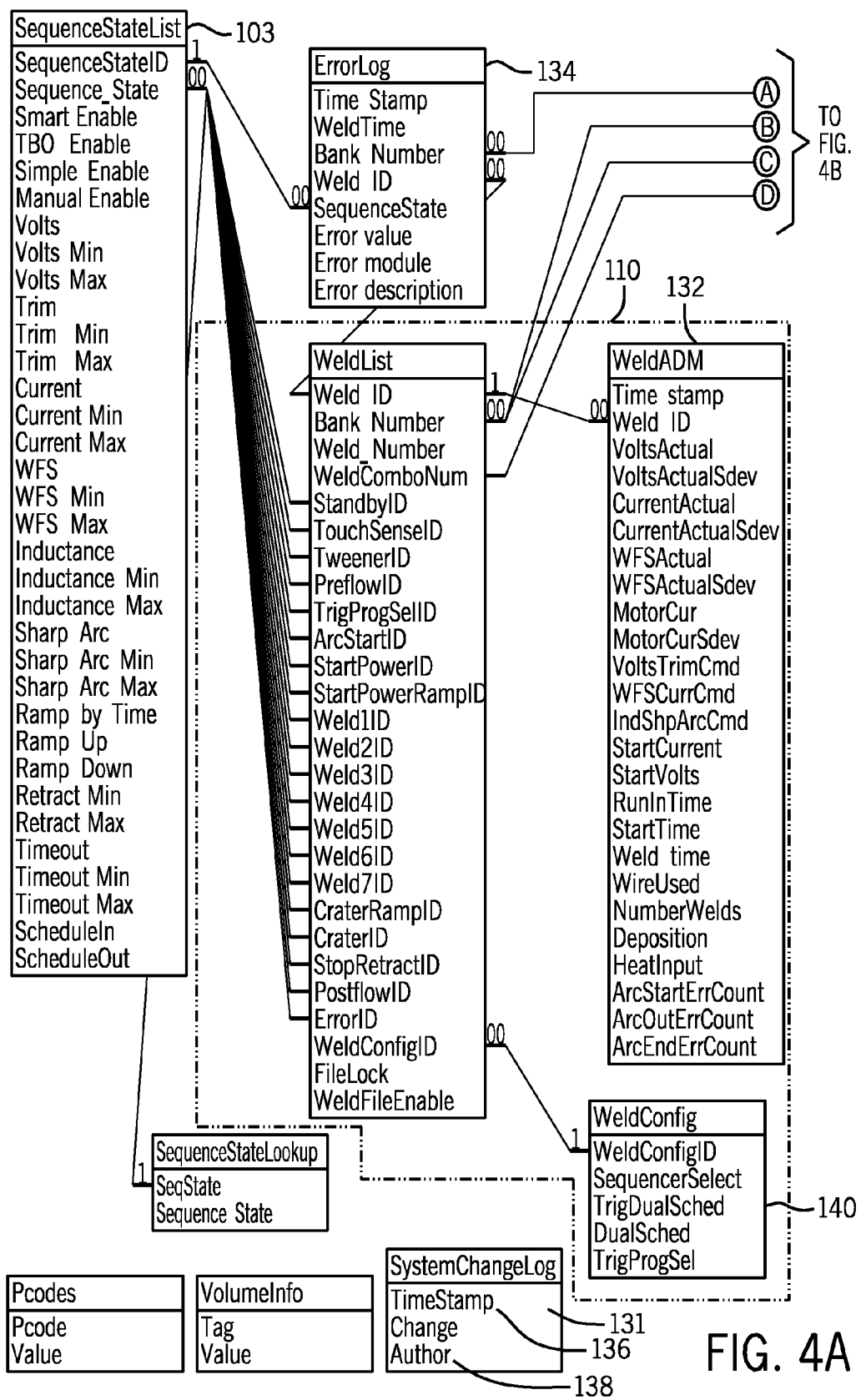
FIGS. 4A-4C are a block diagram illustrating a memory data storage of weld banks in a relational database.
Figure 4B:
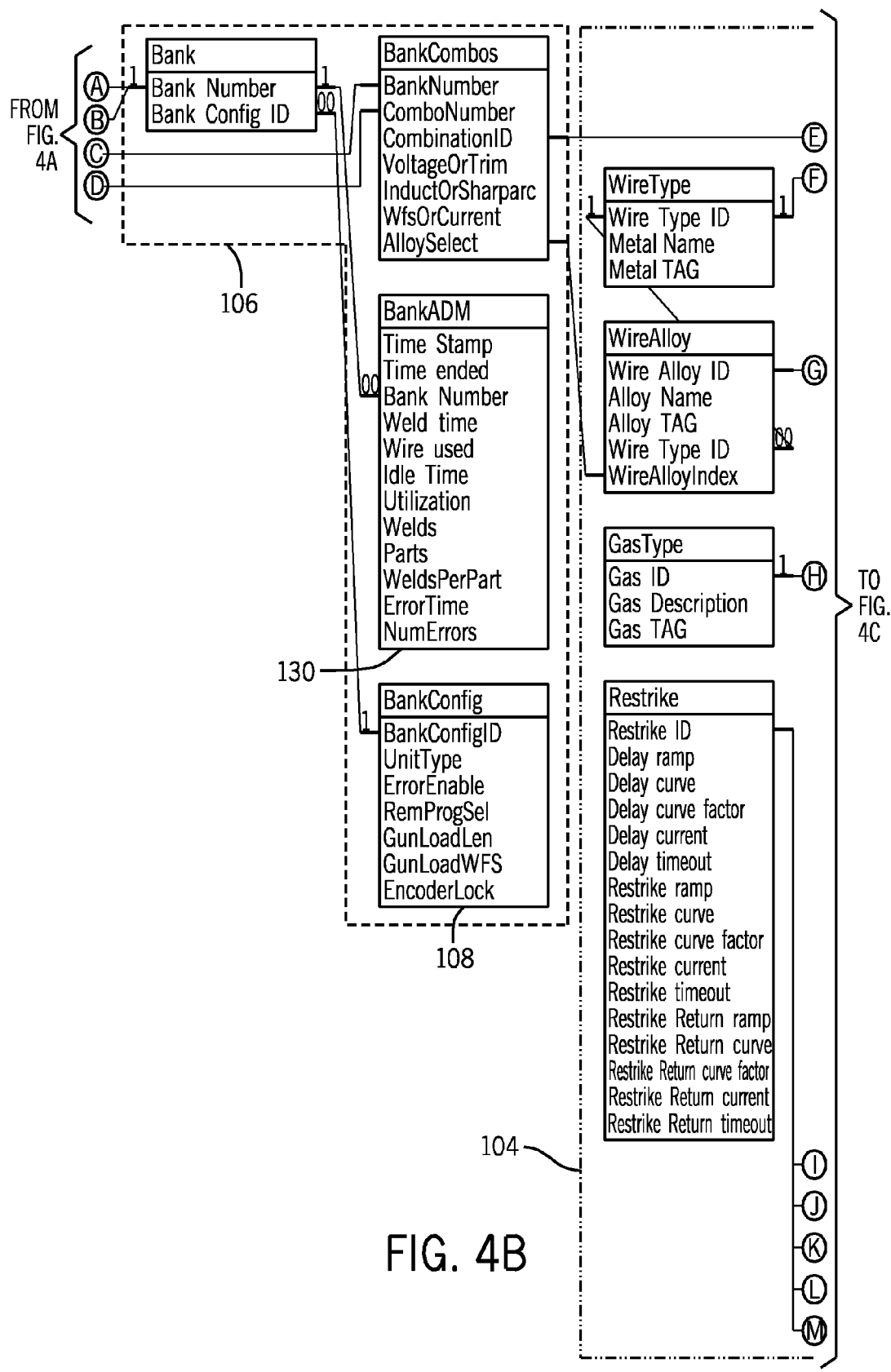
Figure 4C:
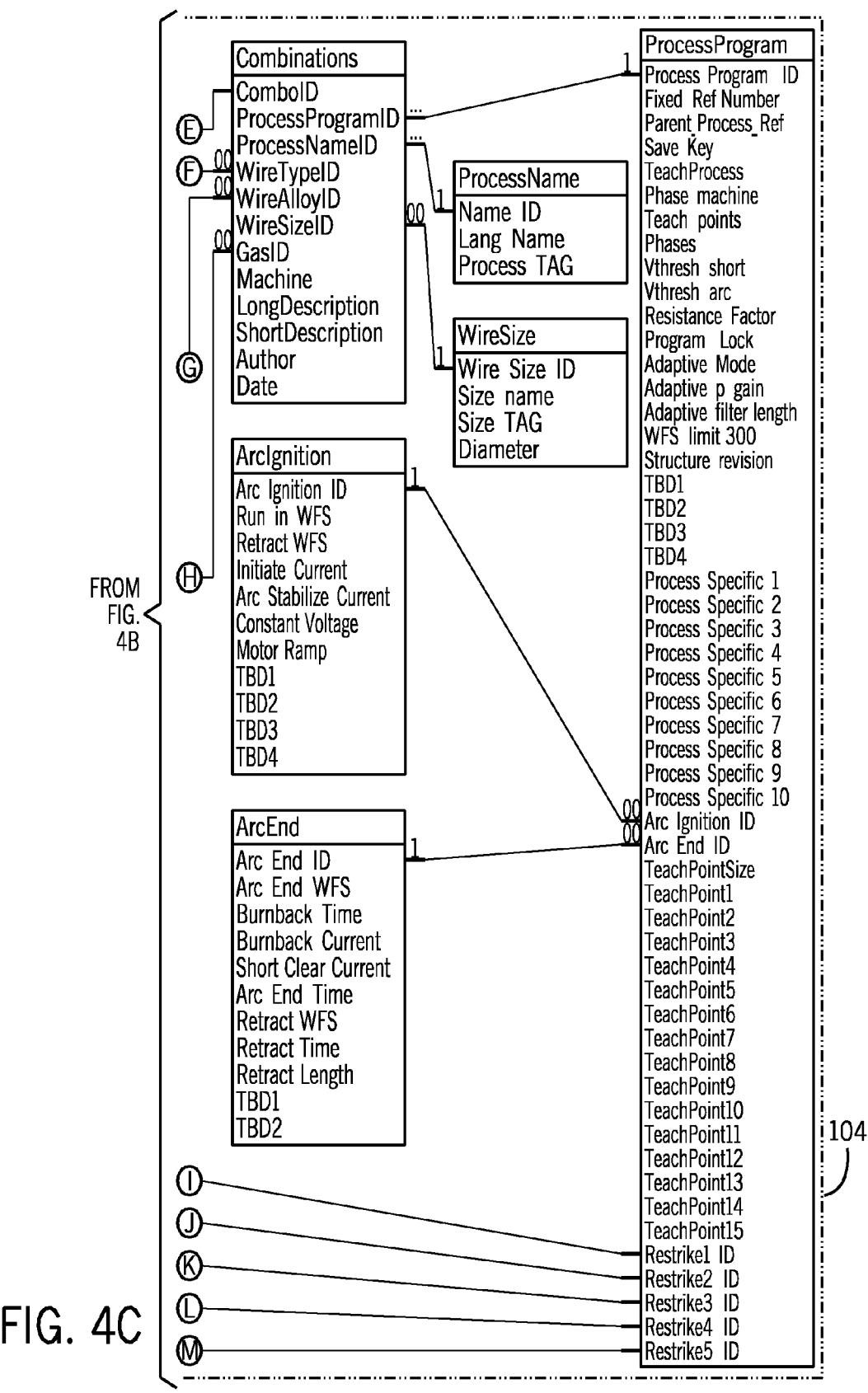

Referring now to FIGS. 4A-4C, in one implementation of the present invention, the memory 18 is constructed to include a relational database. Here, the data structures for storing the weld banks 106, weld files 110, weld programs 104, and weld sequence 103 each include one or more tables which are interconnected to provide a high degree of flexibility. As shown, the weld banks 106 correlate weld programs 104 with specific weld files 110 and sequences 103. A system change table 131 stores time stamp 136 and author 138 parameters to provide tracking data for arc data monitoring and weld program 104 identification, as discussed below.

Referring still to FIGS. 4A-4C, the weld programs 104 are comprised of a plurality of tables which identify weld process (MIG, Pulsed MIG, etc,) as well as consumable data for a specific program, such as wire parameters (size, type, alloy), and gas type. Arc start and re-ignition parameters, for starting (arc ignition) or restarting (restrike) an arc, particularly during pulsing processes, can also be associated with the weld program 104. Each weld program can also include a plurality of teach points, which store taught process data. System data, such as authors and dates, can also be correlated with the programs 104. The tables forming the weld programs 104, as shown, are correlated with tables corresponding to the weld banks 106, and the weld files 110, as discussed above.

Referring still to FIGS. 4A-4C, the weld banks 106 correlate the programs 104 with weld files 110. Each weld bank 106 can also be correlated with a weld bank configuration identifier table 108 which defines the configuration of the welding equipment for the selected bank 106. As shown here, the bank configuration identifier table 108 can include a welding unit type (automatic, semi-automatic, robotic; and a correlating amperage level, e.g. 350 or 450), an error activation/deactivation select (to activate or deactivate errors such as arc start, wire stick, low spool warning, gas flow, etc.), and remote program select activate/deactivate, which can operate with the weld configuration table 140 in the weld file 110, as described below to define a specific type of program select configuration for a weld file 110. Other configuration parameters, such as parameters that define which of two possible gun triggers are active for the corresponding bank 106 in a dual wire feeder mode, and front panel control on/off, can also be provided. Configuration parameters can also establish criteria for switching between weld files. For example, the configuration data may specify to switch from one weld file to another when a trigger is either pulled or released, or when a predetermined time period is reached. A dual switch or other switching device can also be identified in the configuration data to switch between welds. Although a specific set of configuration parameters are shown here, in general, any parameter that is set once for each weld bank 106 can be associated with the bank configuration identifier table 108.

As described above, the weld files 110 are correlated with a plurality of welds, which in turn are correlated with a weld sequence 103 that defines parameters such as voltage, wire feed speed, and inductance for each of the weld sequence states. As shown here the series of welds (Weld1ID, Weld2ID, etc.) associated with each weld file 104 are correlated with a weld program 104 through the weld bank 106, particularly the bank combo table. Each weld file 110 can also include a weld configuration 140. The weld configuration 140 can, for example, define input signals for selecting which of the plurality of welds to activate. A dual schedule configuration, for example, can define two specific welds to be selectively activated by a dual schedule switch. Other forms of program selection, for example, trigger-activated dual schedule, or program select I/O, can also be established and correlated with the selected welds.

To provide monitoring data for welding operations, the weld bank 106 is associated with a bank arc data monitor table 130, and the weld files 110 are associated with a weld arc data monitor table 132, each of which log data and correlate the data with a system time stamp 136. As shown here, the bank arc data monitor table 130 monitors parameters such as weld time, wire usage, and errors that occur for a specific part, while the weld arc data monitor table 132 includes data such as voltage, wire feed speed, and current levels for specific welds, along with error information and arc error counts. An error log 134 can also be provided to correlate errors with both bank identification data and weld identification data, and corresponding time stamps 136.

The present invention therefore provides a significant advantage over prior art systems by providing a highly flexible data storage system, which allows a high level of customization for end users. The invention also increases efficiency by optimizing capital equipment, allowing the same piece of welding equipment to be easily reconfigured between hand-held and automated equipment, and limiting the need for multiple types of welding systems. By providing both hand held and automatic welding in a single device, moreover, the footprint of each automatic welding cell can be reduced, saving space in the manufacturing facility. Further, because welds performed can be easily tied to specific operators and parts, quality control monitoring, based either on specific welded parts or operators, can be simplified.

It should be understood that the methods and apparatuses described above are only exemplary and do not limit the scope of the invention, and that various modifications could be made by those skilled in the art that would fall under the scope of the invention. For example, although an exemplary welding system is described above, this welding system is shown by way of example only, and is not intended to limit the invention. The data structures described above can be used in many different types of welding systems, constructed in various ways. Furthermore, while specific controllers are described above, these descriptions are intended to describe functional aspects, and are not intended to limit the scope of the invention. Various hardware and software configurations can be used, and any number of processing devices can be used to provide the functions described. These devices can be provided in a single housing or distributed in multiple housings and locations.

Furthermore, while a specific set of programming steps are described above for establishing the weld banks data structure, it will be apparent that these steps are exemplary only and the order and type of steps taken could be varied. The schematics illustrating the memory are also provided by way of example, and are not intended to limit the invention.

Furthermore, although a housing is shown in FIG. 1 including several components of the welding system 10, the communications devices, interfaces, controllers, and power source shown can be arranged in housings in various ways. For example, in some applications it is desirable for user interfaces and communications systems to be provided in remote devices. In other applications, these devices can be provided in the housing with power supply 12. In some applications it may be desirable for interfaces to be provided both within and remote to the power supply. Various methods of arranging these components will be apparent to those of ordinary skill in the art.

To apprise the public of the scope of this invention, the following claims are made:

What is claimed is:

1. A memory for storing data for access by an application program executed by a computerized welding system, comprising:
   a weld bank data structure correlating a weld system configuration and a weld file, the weld file comprising:
   a welding process program data structure; and
   a weld sequence data structure defining at least one of a time parameter and a welding process command parameter,
   wherein the weld system configuration includes a weld file transition identifier for transitioning between a selected weld file defining a first weld to be performed and a subsequent weld file defining a second weld to be performed, and the application program is programmed to retrieve the weld bank data structure, configure the computerized welding system using the weld configuration, to perform a weld using data stored in the welding process program and the weld sequence data structures, and to transition from the currently operational weld file and a subsequent weld file when the weld file transition identifier is activated.

2. The memory as recited in claim 1, wherein the weld system configuration selection includes data defining at least one of a semi-automatic, automatic, and robotic welding configuration for the computerized welding system.

3. The memory as recited in claim 1, wherein the welding process program selection includes data for defining at least one of a metal inert gas, pulsed metal inert gas, short circuit metal inert gas and a regulated metal deposition process performed by the computerized welding system.

4. The memory as recited in claim 1, wherein the welding process program selection includes data defining at least one of a wire type, a wire alloy, a material, a material thickness, and a gas.

5. The memory as recited in claim 1, wherein the weld sequence includes data for defining at least one of a pre-flow period, a run-in time, an arc start, a weld start, a weld ramp, a weld, a crater fill, an arc stop, a burn back, and a post-flow sequence.

6. The memory as recited in claim 1, wherein the welding process command parameter comprises at least one of a voltage, a wire feed speed, and a trim command level for the computerized welding system.

7. The memory as recited in claim 1, wherein the weld configuration selection includes an operator configuration.

8. The memory as recited in claim 7, wherein the operator configuration comprises at least one of a trigger hold selection and a dual-schedule selection.

9. The memory as recited in claim 1, wherein the weld bank data structure includes a plurality of weld files, each of the weld files including a welding program selection and a weld sequence selection defining a weld in a series of welds to be performed to weld a defined part.

10. The memory as recited in claim 9, wherein the weld files each include an arc monitoring limit for determining whether a weld performed by the computerized welding system is within a selected parameter.

11. The memory as recited in claim 10, wherein the arc monitoring limit includes at least one of an actual weld voltage limit, an actual weld current limit, and an actual wire feed speed limit.

12. The memory as recited in claim 1, wherein the weld bank data structure comprises a plurality of interrelated tables in a relational database.

13. A computerized welding system comprising:
   a power supply;
   a wire feeder;
   a gas valve;
   a memory storing a weld bank data structure linking a weld system configuration, a weld process program, a weld sequence, and a plurality of weld files through a relational database, each of the weld files correlating a welding process program and a weld sequence selection defining a weld in a series of welds to be performed to weld a defined part, and wherein the weld system configuration provides a weld file transition identifier for transitioning between a selected weld file defining a first weld to be performed and a subsequent weld file defining a second weld to be performed; and a controller operatively coupled to each of the power supply, the wire feeder, and the gas valve, the controller being programmed to retrieve the data structure from the memory, configure the computerized welding system based on the weld system configuration data, and to control the power supply, the wire feeder, and the gas valve to provide the weld process with the parameters defined by the weld sequence and to transition from the currently operational weld file and a subsequent weld file when the weld file transition identifier is activated.

14. The computerized welding system of claim 13, wherein the computerized welding system further comprises an operator interface, and the controller is further programmed to provide access for a user to:
(i) access the memory storing the weld bank data structure;
(ii) select the weld system configuration corresponding to the selected weld bank; and
(iii) select the weld process program and the weld sequence corresponding to the weld bank data structure.

15. The computerized welding system as recited in claim 13, wherein the weld files each include an arc monitoring limit for determining whether a weld performed by the computerized welding system is within a selected set of parameters.

16. The computerized welding system as recited in claim 15, wherein the arc monitoring limit includes at least one of an actual weld voltage limit, an actual current limit, and an actual wire feed speed limit, and the controller is further programmed to monitor the arc monitoring limit while performing a weld.

17. The computerized welding system as recited in claim 16, wherein the controller is further programmed to provide an alert signal to an operator when the arc monitoring limit is exceeded.

18. The computerized welding system as recited in claim 16, wherein the controller is further programmed to store at least one of a time stamp, an operator identifier, and a weld parameter value correlating with the selected arc monitoring limit in memory when the arc monitoring limit is exceeded.

19. The computerized welding system as recited in claim 13, further comprising a welding gun operatively connected to the computerized welding system, and wherein the weld file transition identifier comprises at least one of releasing a trigger of the weld gun and activating a trigger of the weld gun.

20. The computerized welding system of claim 13, further comprising a dual schedule switch operatively connected to the computerized welding system, and wherein the weld file transition identifier comprises receiving a signal from the dual schedule switch.

21. The computerized welding system of claim 13, wherein the controller is further programmed to compare weld data acquired during a weld to stored weld data criteria to identify the weld file transition identifier and to switch from a selected weld to a subsequently defined weld in a sequence when the acquired weld data meets the stored weld data criteria.

22. A method for storing welding data in a relational database in a memory readable by a computerized welding system including an application program for executing a weld based on data retrieved from the relational database, comprising:
storing a plurality of inter-related tables defining a weld process program, the weld process program including a weld process type;
storing a plurality of inter-related tables defining a weld file, the weld file including a weld sequence and a weld process command; and
storing a plurality of weld bank tables, the weld bank tables correlating the weld process programs, the weld files, and a weld file transition indicator defining an indicator for transitioning between a selected weld file defining a first weld to be performed and a subsequent weld file defining a second weld to be performed to provide banks of interrelated data for defining weld process parameters for a weld application program to be executed by the computerized welding system.

23. The method of claim 22, further comprising the step of providing an interface for a user to select the weld process programs and the weld files to be correlated with the weld bank in the inter-related tables.

24. The method of claim 22, further comprising the step of storing the name of the weld bank in the memory.

25. The method of claim 22, further comprising the step of naming the weld bank tables to correspond the weld bank to at least one of a part, an operator, a shift, or a welding skill level.

26. The method of claim 22, further comprising the step of storing at least one weld bank on a portable memory device.

27. The method of claim 26, wherein the portable memory device is a universal serial bus flash drive.

28. The method of claim 22, further comprising the step of storing an arc data monitoring table.

29. The method of claim 28, wherein the arc data monitoring table comprises a weld bank arc data monitoring table, and a weld arc data monitoring table, the bank arc data monitoring table storing at least one of a timing parameter and a weld identifier, and the weld arc monitoring data comprises at least one arc process parameter.

* * * * *